Patented Sept. 28, 1954

2,690,100

UNITED STATES PATENT OFFICE 2,690,100

METHOD OF PRODUCING FIRE-RESISTANT INORGANIC FIBER INSULATION

Alan R. McGarvey, Lancaster Township, Lancaster County, Pa., assignor to Armstrong Cork Company, Lancaster, Pa., a corporation of Pennsylvania No Drawing. Application June 24, 1950, Serial No. 170,270

10 Claims. (Cl. 92—61)

This invention relates to a method of making fire-resistant inorganic fiber insulation. The generic term "mineral wool" will be used to include the various types of inorganic fibers produced from wool-forming ingredients including glass, limestone, and slag.

In the manufacture of mineral wool insulating materials for cold storage use, it is customary to bind the fibers into a relatively rigid self-supporting body by use of a binder of paper pulp and asphalt, and in some instances with phenol-formaldehyde resin. The paper pulp and asphalt-bound product is not fire-resistant; and while the phenol-formaldehyde resin-bound product is not readily flammable, it will support combustion. Attempts have been made to render the phenol-formaldehyde resin-bound product fire-resistant by the incorporation of fire-proofing salts, such as borax, boric acid, diammonium phosphate, and combinations thereof, but these salts are water-soluble and tend to leach out of the board in service. In addition, the salts tend to migrate to the surface of the product during drying and heat curing of the resin.

It is an object of the present invention to provide a method of making fire-resistant inorganic fiber insulation with a phenol-formaldehyde resin binder.

Another object of the invention is to provide a method of making a fire-resistant inorganic fiber insulation in board form and including a phenol-formaldehyde resin binder, the product being characterized by good fire-resistance and sufficient hardness to be readily handled and sawn for convenient installation in cold storage areas and the like.

According to the present invention, a fire-resistant inorganic fiber insulation is prepared by depositing upon the fibers a phenol-formaldehyde binder having incorporated therein a fireproofing material selected from the group consisting of monocalcium phosphate, tri-aluminum phosphate, magnesium ammonium phosphate, and mixtures thereof, and heating the body of fibers with the binder coated thereon at temperatures in the range between about 325° F. and 400° F. until the binder has been activated.

In the practice of the method of this invention, the resin binder is prepared by adding to a water dispersion of phenol-formaldehyde resin, such as Monsanto Chemical Corporation's Resinox No. 756, Durez Plastics & Chemicals Inc.'s Resin No. 14789, and Bakelite Corporation's Resin B. R. 15401, a phosphate selected from the group consisting of monocalcium phosphate, tri-aluminum phosphate, magnesium ammonium phosphate, and mixtures thereof. The quantity of phosphate employed preferably will fall in the range between about 15% and 40% based on the weight of the resin. The upper limit is determined essentially by cost; and, for most commercial needs, 25% of the phosphate will be adequate.

In the preparation of the binder, the finely ground resin and the phosphate are dispersed in water in a suitable mixer; if the resin is difficultly dispersible, one of the commercially available dispersing aids may be employed, although it is preferred not to use them where satisfactorily dispersible resins can be obtained. After the resin and phosphate have been dispersed in the water, the mineral wool fibers are added thereto and the product is then formed into a mat. This may be accomplished by utilizing the apparatus disclosed in Abbott Patent No. 2,481,-486. The quantity of resin and phosphate mixture which is incorporated onto the fibers will vary over a considerable range, depending upon the use to which the product will be put. A satisfactory product for cold storage insulation uses may be prepared from a batch consisting essentially of 95 parts of mineral wool, 4 parts phenol-formaldehyde resin, and 1 part phosphate, all parts being given by weight. Where the Abbott apparatus is used the slurry may contain about 90% to 95% of water as delivered to the forming apparatus. The quantity of binder used is not critical; generally about 5% based on the weight of the fiber will be a minimum, and the maximum will be dictated by cost and physical characteristics desired in the final product.

The formed mineral wool board which contains a substantial quantity of water as delivered from the Abbott machine, in the order of 75%, is then conveyed through a heating or drying oven or chamber to remove moisture and to effect activation or setting of the binder. It has been found that the activation temperature of the resin-phosphate mixture is of extreme importance in obtaining a hard product which may be sawn and handled without damage, and the fire-resisting qualities of the product are also improved by controlled heat treatment. The superior product can be produced if the temperature of curing or activation of the resin-phosphate mixture is maintained in the range between 325° F. and 400° F., and preferably about 350° F. This may be accomplished after the water has been substantially completely removed from the product as by drying the mass at 250° F., for example, and then heating at 350° F. to complete the activation of the resin-phosphate mixture. This oven-heating will require a fairly long period of time because of the excellent insulation value of the product. Satisfactory results have been obtained by heating a board 2½″ thick at 350° F. for about four to six hours. The higher temperatures, of course, may be employed to effect drying as well as heat activation; and under such circumstances, heating at 350° F. for about twenty-four hours will produce a satisfactory 2½″ thick product. The duration of the heating will, of course, depend upon the thickness of the mats, their water content, and other variable factors. There is no substantial curing of the binder effected during water removal, for while the oven may be heated to 350° F., the product will not get much above 220° F. while water is being removed. As soon as the water has been removed, however, the temperature of the product will rise and the outer areas will soon reach oven temperature of 350° F. It requires some time, nevertheless, for the heat to penetrate within the body of the product, because of its good insulating qualities when dry. When the whole mass has attained substantially the temperature of the oven, 350° F., for example, heating for about thirty minutes at such temperature will be adequate to obtain the improved results. Heating for longer periods of time will not deleteriously affect the final product.

Of the phosphates listed above, the monocalcium phosphate is preferred because of its low cost. There is a so-called "sugar" grade of monocalcium phosphate which is low in cost which has proven to be as acceptable commercially as the more refined grades of monocalcium phosphate, the magnesium ammonium phosphate, and the tri-aluminum phosphate. Mixtures of these phosphates may be used. All of the inorganic phosphates do not perform acceptably. I have tried tri-magnesium phosphate, for instance, and have not obtained sufficient fireproofness to warrant the use of such a product. The water-soluble phosphates, of course, are not acceptable, for with cold storage installations moisture is always a factor which must be considered; and any product which tends to be leached out in the presence of moisture cannot be recommended for such service. An additional factor involved, as mentioned above, is the migration of the water-soluble materials to the surface of the formed boards during the drying operation.

The phosphates used are precipitated in their preparation by the manufacturers; and as a result, they are extremely fine powders as commercially available. There is some tendency for these finely divided materials to be removed from the product in the so-called "white water" which is drained or pressed from the mass during formation. It may be necessary to include somewhat higher percentages of the powdered materials in the mixture than the 15% to 40% stated as acceptable in the final product. White water recovery systems can be incorporated in the Abbott machine to reuse the effluent. If it is preferred, the practice of the invention of my copending application Serial No. 170,269, filed June 24, 1950, and entitled "Method of Producing Fire-Resistant Insulation," in which the phosphate is incorporated during resin formation, may be followed; and thus the quantity of phosphate passing off in the white water will be substantially reduced.

I claim:
1. In a method of producing fire-resistant inorganic fiber insulation, the steps comprising: applying to a mass of inorganic fibers a phenol-formaldehyde resin and a phosphate fireproofing agent selected from the group consisting of monocalcium phosphate, tri-aluminum phosphate, magnesium ammonium phosphate, and mixtures thereof, and curing said resin on said fibers in the presence of said phosphate fireproofing agent at a temperature above 325° F.

2. In a method of producing fire-resistant inorganic fiber insulation, the steps comprising: applying to a mass of inorganic fibers a phenol-formaldehyde resin and monocalcium phosphate and curing said resin on said fibers in the presence of said monocalcium phosphate at a temperature above 325° F.

3. In a method of producing fire-resistant inorganic fiber insulation, the steps comprising: applying to a mass of inorganic fibers a phenol-formaldehyde resin and at least 15% by weight, based on the weight of the resin, of a phosphate fireproofing agent selected from the group consisting of monocalcium phosphate, tri-aluminum phosphate, magnesium ammonium phosphate, and mixtures thereof, and curing said resin on said fibers in the presence of said phosphate fireproofing agent to a temperature above 325° F.

4. In a method of producing fire-resistant inorganic fiber insulation, the steps comprising: applying to a mass of inorganic fibers a phenol-formaldehyde resin and 15% to 40% by weight, based on the weight of the resin, of a phosphate fireproofing agent selected from the group consisting of monocalcium phosphate, tri-aluminum phosphate, magnesium ammonium phosphate, and mixtures thereof, and curing said resin on said fibers in the presence of said phosphate fireproofing agent to a temperature above 325° F.

5. In a method of producing fire-resistant inorganic fiber insulation, the steps comprising: applying to a mass of inorganic fibers a phenol-formaldehyde resin and a phosphate fireproofing agent selected from the group consisting of monocalcium phosphate, tri-aluminum phosphate, magnesium ammonium phosphate, and mixtures thereof, and curing said resin on said fibers in the presence of said phosphate fireproofing agent at a temperature between about 325° F. and 400° F.

6. In a method of producing fire-resistant inorganic fiber insulation, the steps comprising: applying to a mass of mineral wool fibers a phenol-formaldehyde resin and about 25% by weight, based on the weight of the resin, of monocalcium phosphate, said resin and phosphate being present on said fibers in a quantity equivalent to about 5% or more of the weight of the fibers, and curing said resin on said fibers in the presence of said monocalcium phosphate at a temperature in the range of about 325° F. to 400° F.

7. In a method of producing fire-resistant inorganic fiber insulation, the steps comprising: forming a water slurry of inorganic fibers, a powdered phenol-formaldehyde resin, and a phosphate fireproofing agent selected from the group consisting of monocalcium phosphate, tri-aluminum phosphate, magnesium ammonium phosphate, and mixture thereof, forming said slurry into a body, removing water therefrom, and curing said resin on said fibers in the presence of said phosphate fireproofing agent at a temperature above about 325° F.

8. In a method of producing fire-resistant inorganic fiber insulation, the steps of claim 7 and a step in which the formed mass is heated at a temperature below 325° F. to effect substantially complete drying of the product which is followed by the curing step of claim 7.

9. In a method of producing fire-resistant inorganic fiber insulation, the steps comprising: applying to a mass of inorganic fibers a phenol-formaldehyde resin and tri-aluminum phosphate and curing said resin on said fibers in the presence of said tri-aluminum phosphate at a temperature above 325° F.

10. In a method of producing fire-resistant inorganic fiber insulation, the steps comprising: applying to a mass of inorganic fibers a phenol-formaldehyde resin and magnesium ammonium phosphate and curing said resin on said fibers in the presence of said magnesium ammonium phosphate at a temperature above 325° F.

References Cited in the file of this patent

UNITED STATES PATENTS

| Number | Name | Date |
|---|---|---|
| 1,160,362 | Baekeland | Nov. 16, 1915 |
| 1,310,841 | Robinson | July 22, 1919 |
| 1,577,890 | Abraham | Mar. 23, 1926 |
| 2,034,522 | Loetscher | Mar. 17, 1936 |
| 2,222,198 | Fleck | Nov. 19, 1940 |
| 2,250,483 | Hopkinson | July 29, 1941 |
| 2,325,302 | Britt | July 27, 1943 |
| 2,338,602 | Schur | Jan. 4, 1944 |
| 2,378,714 | Leatherman | June 19, 1945 |
| 2,378,715 | Leatherman | June 19, 1945 |
| 2,422,730 | Hoffman | June 24, 1947 |
| 2,439,667 | Mathes | Apr. 13, 1948 |
| 2,444,347 | Greger | June 29, 1948 |
| 2,481,486 | Abbott | Sept. 13, 1949 |
| 2,504,744 | Sproul et al. | Apr. 18, 1950 |

OTHER REFERENCES

Maxwell: Paper Trade J., May 13, 1943, p. 41.

Handbook of Chemistry and Physics, 28th ed., pages 283, 287 and 296 (1944), published by Chemical Rubber Pub. Co., Cleveland, Ohio.

Hackh's Chemical Dictionary, 2nd ed., page 443 (1937), published by Blakiston's Son & Co., Inc., Philadelphia.

Flame Proofing of Textile Fabrics, by Little, pages 227, 232 (1947), published by Reinhold Pub. Corp., New York.